United States Patent [19]
Kaifesh

[11] 3,827,154
[45] Aug. 6, 1974

[54] THREAD INSERTS AND GAGE UTILIZING SAME

[76] Inventor: Cass Kaifesh, 9947 Corella, Whittier, Calif. 90603

[22] Filed: Dec. 9, 1971

[21] Appl. No.: 206,472

[52] U.S. Cl............................ 33/199 R, 33/147 M
[51] Int. Cl.......................... G01b 5/12, G01b 5/16
[58] Field of Search.......... 33/199 R, 147 M, 199 B

[56] References Cited
UNITED STATES PATENTS

| | | | |
|---|---|---|---|
| 639,560 | 12/1899 | Hanson | 33/167 |
| 1,423,339 | 7/1922 | Ledell | 33/199 R |
| 1,910,467 | 5/1933 | Heckersdorf | 33/167 |
| 1,939,643 | 12/1933 | Beardsley | 33/199 R |
| 2,027,217 | 1/1936 | Zerkle | 33/199 R |
| 3,432,935 | 3/1969 | Reish | 33/199 R |

Primary Examiner—Louis R. Prince
Assistant Examiner—Richard R. Stearns
Attorney, Agent, or Firm—Smyth, Roston & Pavitt

[57] ABSTRACT

An attachment for a gage which allows the gage to accurately measure the pitch diameter of threads comprising first, second and third thread contacting elements attached to the gage. The three elements are spaced from each other and define a plane. The gage is positionable relative to the threads so that the plane extends generally axially of the threads. At least two of the elements are mounted for limited movement generally parallel to the axis of the threads and each of the elements is sized to be positionable in a groove between adjacent threads and in contact with such threads.

5 Claims, 7 Drawing Figures

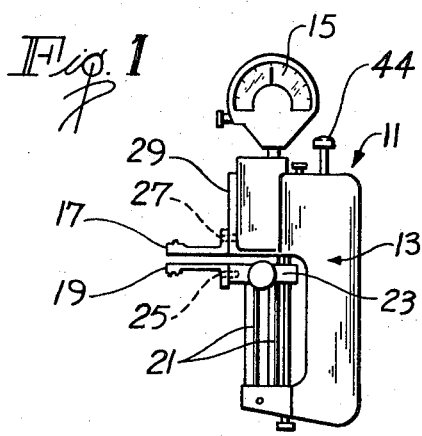
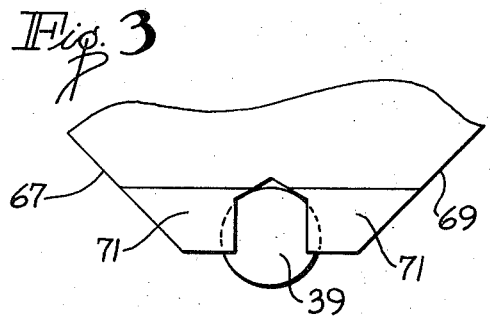
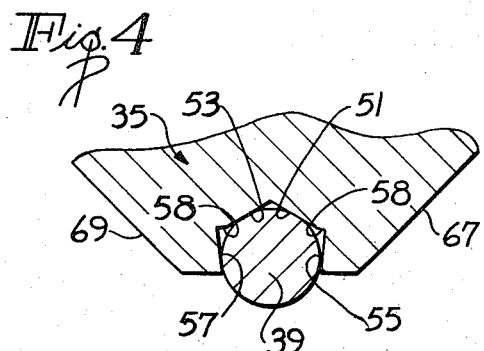
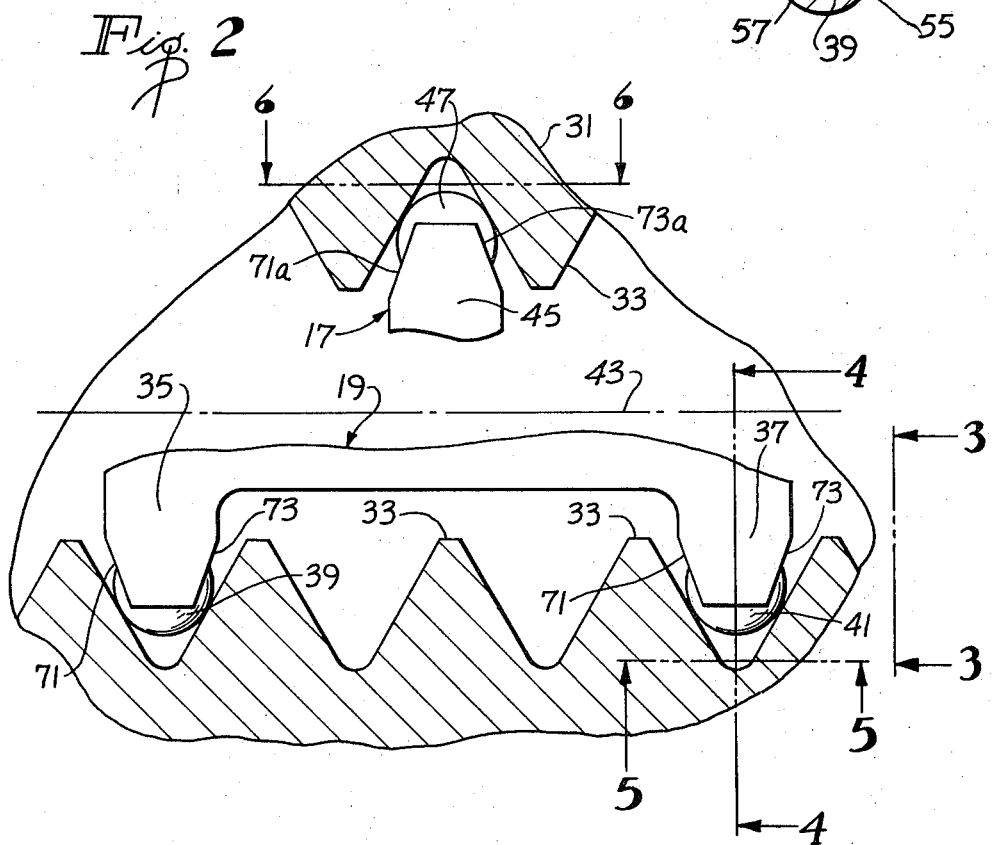

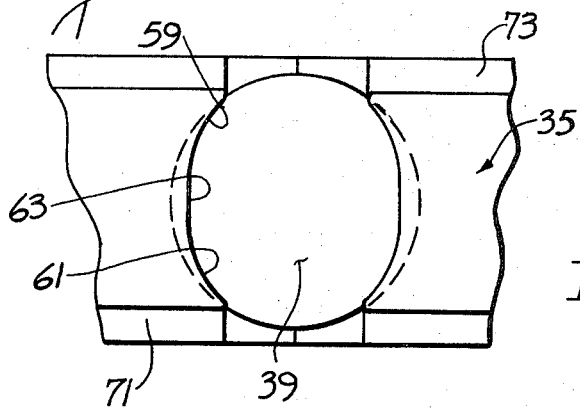
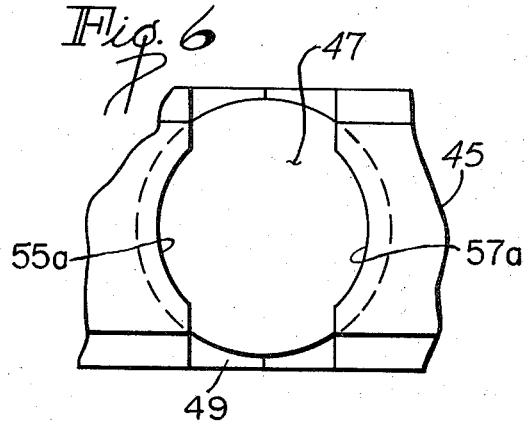
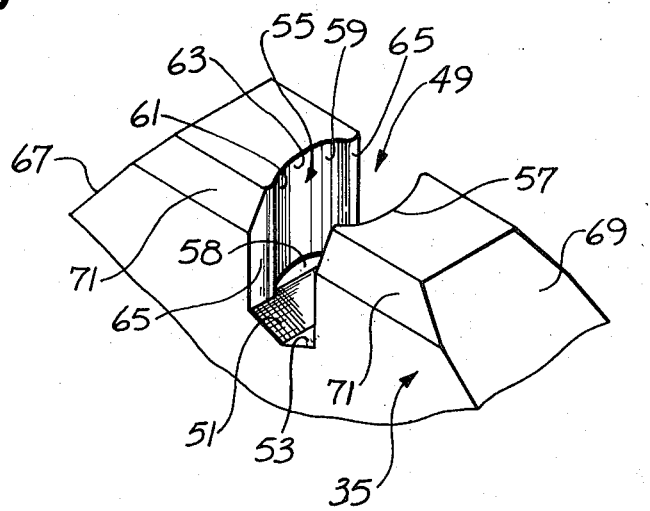

THREAD INSERTS AND GAGE UTILIZING SAME

BACKGROUND OF THE INVENTION

It is often necessary to accurately measure the pitch diameter of threads. The pitch diameter is the distance between diametrically opposed, axially extending pitch lines on the threads. In measuring the pitch diameter of threads, it is customary to use a gage which includes a pair of diametrically opposed, rigid, thread contacting elements. The gage reads essentially the distance between the two thread contacting elements as the pitch diameter. For external threads, the pitch diameter can be measured with rolls; however, due to the geometry of internal threads, rolls cannot be used. Accordingly, the thread contacting elements for internal threads often take the form of sections of mating threads.

It has been proposed to use a three-region contact system for measuring the pitch diameter of threads. In this system three thread contacting elements define a plane extending axially of the threads. The three regions of contact assist in positioning the gage relative to the threads.

While this system functions very satisfactorily, an error in the lead of the threads can introduce an error in the pitch diameter reading provided by the gage. Specifically, an error in lead will prevent one of the thread contacting elements from properly seating against the associated threads and an error in the indicated pitch diameter results.

SUMMARY OF THE INVENTION

The present invention retains all of the advantages of the three region of contact system and eliminates the problem heretofore experienced with lead error. This is advantageously accomplished by making at least two of the three thread contacting elements movable relative to each other. The movement should be sufficient and in a direction to compensate for error in lead. Thus, when measuring threads having lead error, the thread contacting elements move so that all three of them can seat in their respective grooves and the pitch diameter read by the gage is unaffected by lead error.

The three thread contacting elements define a plane having an axis therein which is equidistant from all three of the thread contacting elements. In use, the thread contacting elements are inserted into a part containing internal threads with the plane extending axially of the threads and with the axis thereof substantially coinciding with the axis of the threads.

In order to accommodate for lead error, the movement of the movable thread contacting elements should be in a direction parallel to the axis of the threads. The thread contacting elements should be held against relative movement in any other direction. The amount of movement which the movable thread contacting elements can undergo may vary depending upon the anticipated lead error. For example, permitting each of the movable elements to move in both directions from a true position (i.e., the position which the movable elements would occupy if there were no lead error) approximately 0.0015 inch to 0.003 inch is satisfactory.

In order to eliminate the effect of lead error on pitch diameter reading, it is necessary that at least two of the three thread contacting elements be movable. Although all three of the thread contacting elements could be movable, this is not necessary. If only one of the thread contacting elements were movable, then any lead error between the two fixed elements would tend to cock the gage relative to the part and introduce error in the pitch diameter reading.

In a preferred construction, the first thread contacting element is carried by a first measuring member and the second and third thread contacting elements are carried by a second measuring member. Preferably both movable balls are mounted on the same measuring member. Both of the measuring members are removably attached to the gage. One of the measuring members is movable and the other measuring member is fixed. Preferably the movable thread contacting elements are mounted on the fixed measuring element.

Each of the measuring members includes an elongated shank which is adapted to extend axially of the thread axis and a web extending transversely to the thread axis. Each of the webs carries one thread contacting element and is sufficiently narrow so as to be receivable within a groove with the thread contacting element carried thereby projecting beyond the groove and into contact with the surface threads. Each of the thread contacting members is preferably in the form of a ball.

The invention can best be understood by reference to the following description taken in connection with the accompanying illustrative drawing.

BRIEF DESCRIPTION OF THE DRAWING

FIG. 1 is a side elevational view of a gage constructed in accordance with the teachings of this invention.

FIG. 2 is a fragmentary axial sectional view illustrating generally how the gage of FIG. 1 can be used to measure pitch diameter. In FIG. 2 the gage is shown in a gauging position.

FIG. 3 is a fragmentary end elevational view taken in the direction of the arrows 3—3 in FIG. 2.

FIG. 4 is a sectional view taken generally along line 4—4 of FIG. 2.

FIG. 5 is an enlarged fragmentary plan view taken in the direction of the arrows 5—5 of FIG. 2 and illustrating one of the movable thread contacting elements.

FIG. 6 is a fragmentary plan view similar to FIG. 5 illustrating how the nonmovable ball is retained by its associated finger member.

FIG. 7 is a perspective view of one of the webs for one of the movable thread contacting elements with the thread contacting element removed.

DESCRIPTION OF THE PREFERRED EMBODIMENT

FIG. 1 shows a gage 11 which includes supporting structure 13, an indicator 15, a movable measuring member or finger member 17 and a fixed measuring member or finger member 19. The supporting structure 13 includes a pair of parallel rods 21 to which an adjustable clamp 23 is rigidly mounted. The fixed finger member 19 is removably attached to the clamp 23 as by screws 25. The position of the clamp 23 along the rods 21 can be preset prior to any measuring operation. The movable finger member 17 is removably mounted by screws 27 to a plate 29 which drives the pointer of the indicator 15. Accordingly, the indicator 15 can be preset and thereafter the reading on the indicator is a function of the spacing between the members 17 and 19.

The gage 11 may be of various constructions. In the embodiment illustrated, the gage 11 is identical to the gage described in applicant's copending application Ser. No. 846,356 which was filed on July 31, 1969.

FIG. 2 shows how the members 17 and 19 are utilized to measure pitch diameter. Each of the members 17 and 19 is an elongated finger-like member adapted to be received within a part 31 having internal threads 33. The threads 33 can be of any type and in the embodiment illustrated they have a 60° thread angle.

The fixed finger member 19 has two webs 35 and 37 carrying thread contacting elements in the form of balls 39 and 41. Each of the balls 39 and 41 are movable slightly parallel to the axis 43 of the internal threads 33 and relative to the finger member 19. For example, each of the balls 39 and 41 may be movable from 0.003 inch to 0.006 inch parallel to the axis 43. Because the movable balls 39 and 41 are carried by the same finger, they are movable along the same line. The webs 35 and 37 prevent the balls 39 and 41 from moving relative to each other or relative to the finger member 19 in other directions.

The movable finger 17 has a web 45 which carries a thread contacting element in the form of a ball 47. The web 45 fixes the ball 47 relative thereto so that the ball 47 is not movable relative to the finger member 17.

Of course, the balls 39, 41 and 47 must be sized to be received in the grooves of the threads 33. Preferably each of the balls 39, 41 and 47 is spherical and sized to contact the threads 33 at the pitch line. The balls are preferably constructed of a hard nondeformable material such as carbide and may be, for example, of the order of .036 inch in diameter. The fingers 17 and 19 must be replaced for threads having a different pitch but not for threads having only a different pitch diameter.

The balls 39 and 41 must be spaced apart axially a distance which is an even multiple of the pitch of the threads 33. In FIG. 2 the balls 39 and 41 are spaced axially a distance equal to three pitches and the ball 47 is equidistant, i.e., 1½ pitches from the balls 39 and 41. By so positioning the ball 47, these same balls can be used for threads having one-third the lead of the threads 33. As shown in FIG. 2, the ball 47 is located axially intermediate the balls 39 and 41.

In use of the gage 11, the movable finger 17 can be moved toward the fixed finger 19 by depressing of the plunger 44 (FIG. 1) to thereby allow the fingers to be inserted into the part 31. When the plunger 44 is released, the movable finger 17 moves away from the finger 19 under the influence of a spring (not shown) in the gage. The balls 39, 41 and 47 enter grooves of the threads 39 as shown in FIG. 2 and are equally spaced from the axis 43. In this position the fingers 17 and 19 are parallel to the axis 43 and the plane defined by the balls 39, 41 and 47 extends axially of the threads 33. The three contact regions provided by the balls 39, 41 and 47 assure that the fingers 17 and 19 will be properly oriented.

Because the balls 39 and 41 are movable in a direction parallel to the axis 43, the axial spacing between any two of the balls can be varied. Accordingly, no error in pitch or lead will prevent all three of the balls from engaging the surfaces of their respective grooves. If the three balls were rigidly mounted, an error in lead would prevent one of the balls from seating all the way into its associated groove in which event an error in pitch diameter would be reflected by the indicator 15. Because the balls 39, 41 and 47 are of known diameter, the indicator 15 reads the pitch diameter or provides a reading from which pitch diameter can be determined.

The balls 39 and 41 may be mounted for movement on the fixed finger 19 in different ways. One preferred construction for the web 35 is shown in FIGS. 3–5 and 7, it being understood that the web 33 may be identical.

The web 35 has a slot 49 therein extending axially, i.e., parallel to the axis 43, when the gage 11 is in the position shown in FIG. 2. The slot 49 is defined in part by a pair of identical, planar end walls 51 and 53 which intersect to form an in included angle of 120°. The slot 49 is also defined in part by identical sidewalls 55 and 57. The sidewalls 55 and 57 intersect the end walls 51 and 53, respectively, at narrow ledges 58 (FIG. 4). The sidewalls 55 and 57 taper away from each other as they extend toward their respective end walls as shown in FIG. 4. This taper may be very slight and may be, for example, of the order of threequarters of a degree. The taper of the sidewalls 55 and 57 is exaggerated in FIG. 4 for clarity.

The sidewall 55 has two concave arcuate portions 59 and 61 and a planar central portion 63. The planar section 63 has an axial length equal to the amount of axial movement which the associated ball 39 will be allowed to undergo. The sidewall 55 may also include planar end portions 65. The sidewall 57 is of identical configuration. The other two sides of the slot 49 are open as shown in FIG. 7.

The external configuration of the web 35 is such as to permit the web 35 to be used on internal threads and to permit the web to be received within a groove of the threads 33. To allow the web 35 to be used to make an internal measurement, the web has relatively small exterior dimensions and sidewalls 67 and 69 which slope, for example, at a 30° angle. To allow the web 35 to be received in a groove, it is provided with sloping sidewall segments 71 and 73. Preferably the surfaces 71 and 73 taper inwardly relative to the adjacent thread surfaces (FIG. 2) to thereby assure that these surfaces will not contact the threads 33.

The diameter of the ball 39 is slightly larger than the spacing between the sidewalls 55 and 57, and this allows the ball 39 to be snapped into the slot 49. In this position, the ball 39 can move from 0.003 to 0.006 inch parallel to the axis 43 when it is in the position shown in FIG. 2. The ball 39 bears against the end walls 51 and 53 and the sidewalls 55 and 57 all of which cooperate to prevent movement of the ball 39 in any other direction.

With the ball 39 installed in the slot 49, it projects out of the slot 49 in a direction opposite the end walls 51 and 53 as shown in FIGS. 3 and 4. The ball 39 also projects outwardly beyond portions of the segments 71 and 73 as shown in FIG. 5. Moreover, the ball 39 will project outwardly of portions of the segments 71 and 73 regardless of its position within the slot 49. Thus, the ball 39 is always in a position to engage the threads 33 and the web 35 will not in ordinary usage engage the threads.

The web 45 is identical to the web 35 in all respects except that the sidewalls thereof do not have central planar portions 63. Parts of the web 45 corresponding to parts of the web 35 are designated by corresponding reference numbers followed by the letter *a*. The ball 47 is held by the web 45 against any movement relative thereto. The sidewalls 55*a* and 57*a* of the slot 49*a* may be tapered less than the sidewalls of the slot 49.

Preferably the movable finger 17 carries a single ball which is not movable relative thereto. This however is not essential and the movable finger 17 may carry two balls and both of them may be movable, if desired. However, in the preferred construction two movable balls are carried by the fixed finger 19.

Although an exemplary embodiment of the invention has been shown and described, many changes, modifications and substitutions may be made by one having ordinary skill in the art without necessarily departing from the spirit and scope of this invention.

I claim:

1. A gage for measuring the pitch diameter of threads comprising:

a supporting structure;

a first measuring member;

means for mounting said first measuring member on said supporting structure in fixed relationship relative thereto;

a second measuring member;

means for mounting said second measuring member on said supporting structure for movement relative thereto and generally toward and away from said first measuring member;

a first ball carried by one of said measuring members for engaging said threads;

the other of said measuring members having first surface means for defining a first slot and second surface means for defining a second slot;

second and third balls carried by said first and second slots, respectively, of said other measuring member;

said first, second, and third balls being spaced from each other and defining a plane such that when the gage is located in a gauging position the axis of the threads lies substantially in said plane;

each of said surface means including an end wall and a pair of spaced sidewalls which diverge as they extend toward said end wall;

each of said sidewalls having at least a pair of concave arcuate portions joined by a generally planar section, said second and third balls bearing against the sidewalls and the end wall of the associated slot with said planar sections being oriented to allow said balls to undergo limited movement parallel to the axis of said threads when the gage is located in a gauging position;

said balls being sized to be received in the grooves between adjacent threads and in contact with such threads whereby error in the lead of the threads can be compensated for by movement of said second and third balls generally parallel to said axis; and indicator means on said supporting structure for providing an indication of the pitch diameter of the threads.

2. A gage as defined in claim 1 wherein said second and third balls are carried by said first measuring member, said third ball being carried by said second measuring member in fixed relationship thereto.

3. A gage as defined in claim 1 wherein said other measuring member is elongated and includes first and second webs, each of said webs being of a size to be at least partially received between adjacent threads, said first and second slots being in said first and second webs, respectively, a portion of each of said second and third balls being outside of the associated web for engagement with the threads.

4. A gage as defined in claim 1 wherein said slots are dimensioned such that each of said second and third balls is movable generally parallel to said axis no less than approximately 0.003 inch and no more than approximately 0.006 inch.

5. A gage as defined in claim 1 wherein at least one of said means for mounting detachably mounts the associated measuring member on the supporting structure.

* * * * *